United States Patent
Miyazaki et al.

(10) Patent No.: US 6,933,040 B2
(45) Date of Patent: Aug. 23, 2005

(54) HARD COAT FILM

(75) Inventors: Wataru Miyazaki, Saitama (JP); Shigenobu Maruoka, Tokyo (JP)

(73) Assignee: Lintec Corporation, Tokyo (JP)

( * ) Notice: Subject to any disclaimer, the term of this patent is extended or adjusted under 35 U.S.C. 154(b) by 18 days.

(21) Appl. No.: 10/086,243

(22) Filed: Mar. 4, 2002

(65) Prior Publication Data

US 2002/0164493 A1 Nov. 7, 2002

(30) Foreign Application Priority Data

Mar. 5, 2001 (JP) ........................................ 2001-060960

(51) Int. Cl.$^7$ ................................................. B32B 5/16
(52) U.S. Cl. ........................ 428/200; 428/202; 428/343; 428/329
(58) Field of Search ................................ 428/200, 202, 428/343, 329, 520, 522; 522/19

(56) References Cited

U.S. PATENT DOCUMENTS

| | | | |
|---|---|---|---|
| 6,208,790 B1 * | 3/2001 | Zopf et al. | 385/128 |
| 2002/0110643 A1 * | 8/2002 | Sokol | 427/384 |
| 2002/0132871 A1 * | 9/2002 | Colton et al. | 522/7 |
| 2004/0081764 A1 * | 4/2004 | Liu et al. | 427/376.1 |

* cited by examiner

Primary Examiner—D. Lawrence Tarazano
(74) Attorney, Agent, or Firm—Sughrue Mion, PLLC

(57) ABSTRACT

A hard coat film which comprises a substrate and a hard coat layer, wherein the hard coat layer is formed by applying on the substrate with a curable composition containing a photocurable substance and an oligomer type photopolymerization initiator and then curing by light irradiation to the applied curable composition. The hard coat film is excellent in the adhesion property between the hard coat layer and the substrate after heat treatment, and can restrain the gases generated in heat treatment.

5 Claims, No Drawings

HARD COAT FILM

BACKGROUND OF THE INVENTION

1. Field of the Invention

The present invention relates to a hard coat film which can be used as a protective film for liquid crystal devices, CRT (cathode-ray tube) display devices, plasma display devices, electrochromic display devices, light emitting diode devices, EL (electroluminescence) display devices et al. and parts of display devices such as touch panels, and can be used as a functional film.

2. Description of Related Art

In recent years, for protecting various displays et al., the displays have been superimposed with a plastic film. As the protecting plastic films, plastic films containing a hard coat layer obtained by coating with an active energy ray curable resin have been used.

Some of the protective plastic films need to be heat treated, when the protective films were adhered to the various displays et al. or after the adhesion.

However, there were a problem that the heat treated plastic films were poor in adhesion property between the hard coat layer and the substrate film and a problem that many gases derived from the polymerization initiator, such as gases generated by decomposition or vaporization of the polymerization initiator in heat treatment, were generated.

An object of the present invention is to provide a hard coat film which is excellent in the adhesion property between the hard coat layer and the substrate after heat treatment, and can restrain the gases generated in heat treatment.

Extensive investigations undertaken by the present inventors directed to the object described above have led to the discovery that the object can be achieved by forming a hard coat layer on the substrate, wherein the hard coat layer is formed by applying on the substrate with a curable composition containing a photocurable substance and an oligomer type photopolymerization initiator and then curing by light irradiation to the applied curable composition.

The present invention thus provides a hard coat film which comprises a substrate and a hard coat layer, wherein the hard coat layer is formed by applying on the substrate with a curable composition containing a photocurable substance and an oligomer type photopolymerization initiator and then curing by light irradiation to the applied curable composition.

In another aspect, the present invention provides the hard coat film, as described above, wherein the oligomer type photopolymerization initiator is an oligomer type photopolymerization initiator represented by formula (1):

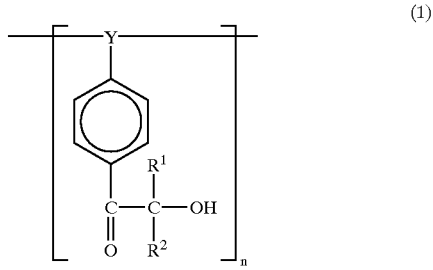

(1)

wherein Y is a linear or branched alkylene group, $R^1$ and $R^2$ are a linear or branched alkyl group, and n is an integer of 2 to 50.

DESCRIPTION OF PREFERRED EMBODIMENTS

The substrate of the hard coat film of the present invention is not limited particularly and includes, for example, films such as films of polyester resins, polyethylene resins, polypropylene resins, polystyrene resins and polycarbonate resins and filler compounded films thereof; and synthetic papers. Polyester resins include preferably polyethylene terephthalate resins and polybutylene terephthalate resins.

A thickness of the substrate is preferably in a range of from 10 to 350 micrometers, more preferably in a range of from 25 to 300 micrometers, most preferably in a range of from 50 to 250 micrometers.

The surface of the substrate can be treated for easy adhesion. The easy adhesion treatments are not limited particularly and include a corona discharge treatment and a formation of layer of low molecular weight resin polymer which is the same as the resin of the substrate. For example, when the substrate is made of polyester resin, for example, polyethylene terephthalate resin, the low molecular weight resin polymer includes low molecular weight polyesters, for example, ethylene terephthalate oligomers.

The hard coat film of the present invention has the hard coat layer on the surface of the substrate. The hard coat layer can be formed only one surface or both surfaces of the substrate.

The hard coat layer can be formed by applying on the substrate with a curable composition containing a photocurable substance and an oligomer type photopolymerization initiator and then curing by light irradiation to the applied curable composition.

A thickness of the hard coat layer is not limited particularly and usually preferably in a range of from 1 to 50 micrometers, more preferably in a range of from 2 to 30 micrometers, most preferably in a range of from 3 to 20 micrometers.

The photocurable substance can be cured by light irradiation and includes unsaturated monomers, oligomers, resins or compositions thereof. The examples include polyfunctional radiation curing type acrylic compound having two or more functional groups, such as acrylates, urethane acrylates and polyester acrylates and preferably ethylene glycol di(meth)acrylate, propylene glycol di(meth)acrylate, butylene glycol di(meth )acrylate, neopentyl glycol di(meth )acrylate, hexanediol di(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, triallyl(meth)acrylate and di(meth)acrylate modified with bisphenol A ethylene oxide.

The photocurable substance can be utilized by single member or a combination of two or more members.

The oligomer type photopolymerization initiator is a photopolymerization initiator having two or more repeat units having photopolymerization initiation activity and is preferably a photopolymerization initiator having 2 to 50 of the repeat units. Examples of the oligomer type photopolymerization initiator include a photopolymerization initiator represented by formula (1):

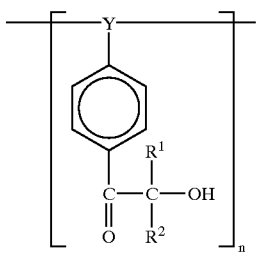

(1)

wherein Y is a linear or branched alkylene group, $R^1$ and $R^2$ are a linear or branched alkyl group and may form a ring by bonding each other, and n is an integer of 2 to 50.

The number of carbon atoms in a linear or branched alkylene group of Y is not limited particularly and preferably 1 to 10, more preferably 1 to 6, most preferably 1 to 3. The number of carbon atoms in a linear or branched alkyl group of $R^1$ and $R^2$ is not limited particularly and preferably 1 to 8, more preferably 1 to 5, most preferably 1 to 3. The integer, n, is preferably 2 to 20, more preferably 2 to 10, most preferably 2 to 6.

The terminal of the chain of repeat unit in the oligomer type photopolymerization initiator are each bonded with a substitution group. The substitution group may be a group derived from an oligomer polymerization initiator or may be a group derived from an oligomer polymerization terminator and includes usually hydrogen atom and hydrocarbon groups. The hydrocarbon groups include, for example, alkyl group, cycloalkyl group and aryl group. Alkyl group includes lower alkyl groups such as methyl group, ethyl group, propyl group and butyl group. Cycloalkyl group includes cyclohexyl group, cycloheptyl group, cyclooctyl group and alkyl group-substituting group thereof. Aryl group includes phenyl group and alkyl group-substituting group thereof.

Examples of the oligomer type photopolymerization initiator include poly[2-hydroxy-2-methyl-1-{4-(1-methylvinyl)phenyl} propanone], poly[2-hydroxy-2-methyl-1-{4-vinyl-phenyl} propanone], poly[2-hydroxy-2-ethyl-1-{4-(1-methylvinyl) phenyl} propanone], poly[2-hydroxy-2-ethyl-1-{4-vinyl-phenyl} propanone], poly[2-hydroxy-2-methyl-1-{4-(1-methylvinyl) phenyl} butanone], poly[2-hydroxy-2-methyl-1-{4-vinyl-phenyl} butanone], poly[2-hydroxy-2-ethyl-1-{4-(1-methylvinyl) phenyl} butanone] and poly[2-hydroxy-2-ethyl-1-{4-vinyl-phenyl} butanone].

The oligomer type photopolymerization initiator can be utilized by single member or a combination of two or more members.

With respect to the formulation ratio of the photocurable substance and the oligomer type photopolymerization initiator, the amount of the oligomer type photopolymerization initiator is usually preferably 0.01 to 20 parts by weight, most preferably 0.1 to 10 parts by weight against to 100 parts by weight of the photocurable substance.

In the present invention, the oligomer type photopolymerization initiator can prevent almost the generation of gas derived from the polymerization initiator.

The curable composition can be formulated with a filler such as silica, which includes colloid silica, silicone powder, mica, glass bees, acrylic fine powder and hollow particulate to add nonglaring property. The amount of the filler is preferably 0.5 to 50 parts by weight against to 100 parts by weight of the photocurable substance. When the amount of the filler is less than 0.5 parts by weight, the nonglaring property decreases. When the amount of the filler is more than 50 parts by weight, the strength of the film decreases.

The curable composition can contain an antimicrobial agent. The antimicrobial agent includes various antimicrobial agents such as silver inorganic antimicrobial agents including silver inorganic antimicrobial agent having zirconium phosphate as a support, silver inorganic antimicrobial agent having zeolite as a support, silver inorganic antimicrobial agent having calcium phosphate as a support, silver inorganic antimicrobial agent having silica gel as a support; amino acid organic antimicrobial agents including organic antimicrobial agent compounded with an amino acid compound; organic antimicrobial agents compounded with a nitrogen-containing sulfur compound.

The amount of the antimicrobial agent can be selected according to the kind of the antimicrobial agent, required antimicrobial property and the holding time et al.

The curable composition can contain additives such as a light stabilizer, an ultraviolet absorbent, a catalyst, a coloring agent, an antistatic agent, a lubricant, a leveling agent, a defoaming agent, a polymerization promotor, an antioxidant, a flame retardant, an infrared absorbent, a surface active agent and a surface modifier.

The curable composition can contain a diluent for easy application. The diluent includes aromatic hydrocarbons such as benzene, toluene and xylene; aliphatic hydrocarbons such as hexane, heptane, octane, nonane and decane; and ketones such as methyl ethyl ketone, diethyl ketone and diisopropyl ketone. The amount of the diluent can be selected to be the required viscosity.

In the present invention, the curable composition is applied on the substrate and cured by light irradiation to form the hard coat layer.

The irradiated light includes electromagnetic waves such as visual ray, ultraviolet ray and electron ray. Usually, ultraviolet ray can be used. As the ultraviolet ray, ultraviolet ray radiated from an ultraviolet lamp can be usually used. As the ultraviolet lamp, the ultraviolet lamp which emit an ultraviolet ray having a spectrum distribution in the area of 300 to 400 nm of wave length can be usually used.

The hard coat film of the present invention can be used as a protective film for liquid crystal devices, CRT(cathode-ray tube) display devices, plasma display devices, electrochromic display devices, light emitting diode devices, EL (electroluminescence) display devices et al. and parts of display devices such as touch panels, and can be used as a functional film.

For fitting the hard coat film of the present invention to an adherend, a pressure-sensitive adhesive layer can be formed on an opposite surface to the surface having the hard coat layer of the substrate having the hard coat film.

As a pressure-sensitive adhesive used in the pressure-sensitive adhesive layer, various pressure-sensitive adhesives can be used. The various pressure-sensitive adhesives include, for example, acrylic pressure-sensitive adhesives, silicone pressure-sensitive adhesives, rubber pressure-sensitive adhesives and polyester pressure-sensitive adhesives.

The pressure-sensitive adhesive can contain a tackifier, a filler, a softener, an antioxidant, an ultraviolet absorbent and a curing agent according to needs. The tackifier includes rosin resins, terpene phenol resins, terpene resins, aromatic hydrocarbon modified terpene resins, petroleum resin, coumarone-indene resins, styrene resins, phenol resins and xylene resins. The filler includes zinc white, titanium oxide, silica, calcium carbonate and barium sulfate. The softener includes process oils, liquid rubbers and plasticizers. The antioxidant includes anilideantioxidants, phenol antioxidants, phosphite antioxidants and thioester antioxidants. The ultraviolet absorbent includes benzophenone ultraviolet absorbents and benzotriazole ultraviolets. The curable agent includes epoxy curable agents, isocyanate curable agents and metallic chelate agents.

The thickness of the pressure-sensitive adhesive layer is usually in the range from 5 to 100 μm, and preferably 10 to 50 μm. For protecting the surface of the pressure-sensitive layer, a release liner is preferably laminated on the surface of the pressure-sensitive layer.

In the hard coat film of the present invention, the substrate may be printed and then the hard coat layer and the pressure-sensitive adhesive layer may be formed, or the pressure-sensitive adhesive layer may be printed according to needs.

EXAMPLES

The present invention is described more specifically by reference to embodiments thereof. It should be noted that the present invention is not intended to be limited by these embodiments.

An evaluation method of adhesion property, measurement method of gas generation in heat treatment and measurement method of pencil hardness of the hard coat films obtained in examples and comparative examples are described in the following.

(Evaluation Method of Adhesion Property)

A surface of the hard coat layer of the hard coat film was cut by a cutter to form 100 cross hatchings wherein the size of one cross hatching is 1 mm×1 mm and then a cellophane pressure-sensitive adhesive tape (produced by NICHIBAN Co., Ltd.) was adhered on the surface of the hard coat layer. Next, the cellophane pressure-sensitive adhesive tape was peeled from the surface. The adhesion property was evaluated by counting the number of cross hatchings of the hard coat layer left on the substrate. The evaluation of initial adhesion property was conducted by using the hard coat film which was left at room temperature for one day. Also, the evaluation of adhesion property in heat treatment was conducted by using the hard coat film which was heated at 150° C. for one hour and then left at room temperature for one day.

(Measurement Method of Gas Generation in Heat Treatment)

A specimen of 5.0 cm$^2$ was prepared by cutting the hard coat film. And then the specimen was heated at 100° C. for 10 minutes. The generated gas was trapped by using Purge and Trap-Head Space Sampler (JHS-100A, produced by Nippon Analysis Industries Co.,Ltd.) in a purge and trap method. And the trapped gas was measured by a glass chromatograph mass analizer (Turbo Mass, produced by PERKIN ELMER Co., Ltd.) to confirm the gas generation or nongeneration.

(Measurement Method of Pencil Hardness)

The pencil hardness of the surface of the hard coat layer in the hard coat film was measured in hand lacing method according to JAPANESE INDUSTRIAL STANDARD K5400.

Example 1

Five parts by weight of poly[2-hydroxy-2-methyl-1-{4-(1-methylvinyl)phenyl}propanone] (produced by LANBELTY CORPORATION, ESACURE KIP150, being a mixture of the polymers having the repeat unit number (n) of 2 to 5, and having each methyl group as substitution group bonded to both terminals of chain part of repeat unit) was added to 100 parts by weight of dipentaerythritol hexaacrylate (produced by NIPPON KAYAKU Co.,Ltd., KAYARAD DPHA) and mixed. Further, toluene was added to prepare a curable composition having 50 percents by weight of resin solid content.

Next, the curable composition was applied by a wire bar on one surface of a polyethylene terephthalate film of a thickness of 188 μm, in which both surfaces were treated with low molecular weight polyester resin to improve adhesion property. And toluene was vaporized to form the curable composition layer having a thickness of 5 μm. And then, ultraviolet ray of high pressure mercury ultraviolet lamp (120 w/cm) was irradiated to the curable composition layer from the side of the layer in the condition of total light volume of about 250 mJ/m$^2$. The curable composition layer was cured to obtain a hard coat film. The adhesion property and the gas generation in heat treatment of the hard coat film and the pencil hardness of the hard coat layer were shown in Table 1.

Example 2

Five parts by weight of synthesis silica having an average particle diameter of 1.8 μm (produced by FUJI SILYIA CHEMICAL Co., Ltd., SYLYSIA 350) and 5 parts by weight of poly[2-hydroxy-2-methyl-1-{4-(1-methylvinyl) phenyl}propanone] (produced by LANBELTY CORPORATION, ESACURE KIP150) were added to 100 parts by weight of dipentaerythritol hexaacrylate (produced by NIPPON KAYAKU Co.,Ltd., KAYARAD TMPTA) and mixed. Further, toluene was added to prepare a curable composition having 50 percents by weight of resin solid content.

Next, the curable composition was applied by a wire bar on one surface of a polyethylene terephthalate film of a thickness of 188 μm, in which both surfaces were treated with low molecular weight polyester resin to improve adhesion property. And toluene was vaporized to form the curable composition layer having a thickness of 3 μm. And then, ultraviolet ray of high pressure mercury ultraviolet lamp (120 w/cm) was irradiated to the curable composition layer from the side of the layer in the condition of total light volume of about 250 mJ/m$^2$. The curable composition layer was cured to obtain a hard coat film. The adhesion property and the gas generation in heat treatment of the hard coat film and the pencil hardness of the hard coat layer were shown in Table 1.

Comparative Example 1

A hard coat film was prepared in the same method as described in Example 1 except that 1-hydroxy-cyclohexyl-phenyl-ketone (produced by CHIBA GIGY CORPORATION, IRGACURE 184) instead to poly[2-hydroxy-2-methyl-1-{4-(1-methylvinyl)phenyl} propanone]. The adhesion property and gas generation in heat treatment of the obtained hard coat films and pencil hardness of the obtained hard coat layer were shown in Table 1. The gas generated in the heat treatment was a gas derived from the photopolymerization initiator.

Comparative Example 2

A hard coat film was prepared in the same method as described in Example 2 except that 1-hydroxy-cyclohexyl-phenyl-ketone (produced by CHIBA GIGY CORPORATION, IRGACURE 184) instead to poly[2-hydroxy-2-methyl-1-{4-(1-methylvinyl)phenyl} propanone]. The adhesion property and gas generation in heat treatment of the obtained hard coat films and pencil hardness of the obtained hard coat layer were shown in Table 1. The gas generated in the heat treatment was a gas derived from the photopolymerization initiator.

TABLE 1

|  | Initial adhesion property | Adhesion property after heat at 150° C. for 1 hour | Gas generation in heat treatment | Pencil hardness |
| --- | --- | --- | --- | --- |
| Example 1 | 100/100 | 100/100 | Non generation | 2 H |
| Example 2 | 100/100 | 100/100 | Non generation | 2 H |
| Comparative Example 1 | 100/100 | 30/100 | Generation | 2 H |
| Comparative Example 2 | 100/100 | 70/100 | Generation | 2 H |

What is claimed is:

1. A hard coat film which comprising a substrate and a hard coat layer,
   wherein the hard coat layer is formed by applying on the substrate with a curable composition containing a photocurable substance, an oligomer type photopolymerization initiator, and a filler that provides a non-glaring property,
   wherein a pressure-sensitive adhesive layer is formed for fitting the hard coat film to an adherent,
   wherein the filler is present in a ratio of 0.5 to 50 parts by weight per 100 parts by weight of the photocurable substance, and
   wherein the curable composition is cured by light irradiation.

2. The hard coat film as claimed in claim 1, wherein the thickness of the pressure-sensitive adhesive is from 5 to 100 micrometers.

3. The hard coat film as claimed in claim 1, wherein the substrate is printed and then the hard coat layer and the pressure-sensitive adhesive layer are formed.

4. The hard coat film as claimed in claim 1, wherein the pressure-sensitive adhesive layer is printed.

5. The hard coat film as claimed in claim 1, wherein the oligomer type photopolymerization initiator is represented by formula (1):

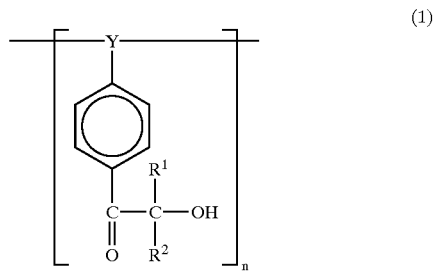

wherein Y is a linear or branched alkylene group, $R^1$ and $R^2$ are a linear or branched alkyl group, and n is an integer of 2 to 50.

* * * * *